No. 898,175. PATENTED SEPT. 8, 1908.
W. E. BELT.
POWER TRANSMISSION MECHANISM.
APPLICATION FILED JULY 8, 1907.
3 SHEETS—SHEET 1.
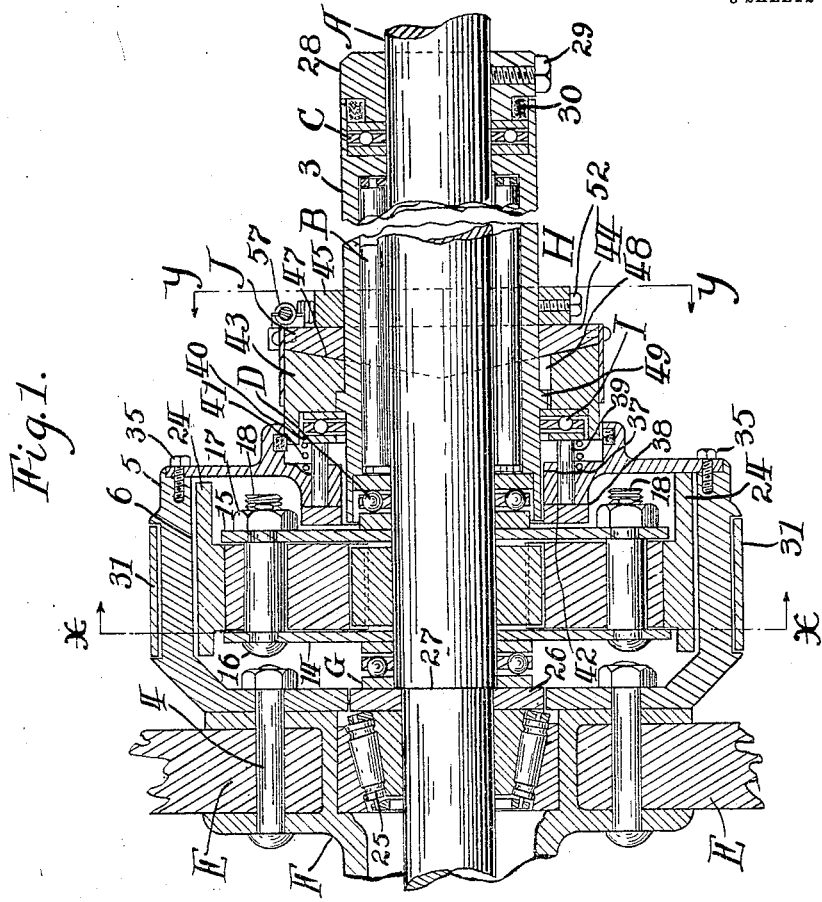
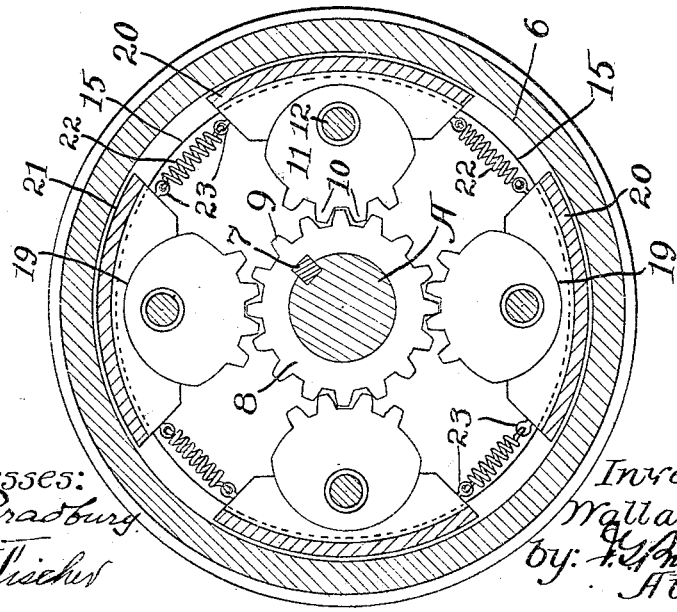
Witnesses:
H. Bradbury
A. Fischer
Inventor:
Wallace E. Belt,
by: H. Bradbury
Attorney.

No. 898,175. PATENTED SEPT. 8, 1908.
W. E. BELT.
POWER TRANSMISSION MECHANISM.
APPLICATION FILED JULY 8, 1907.
3 SHEETS—SHEET 2.
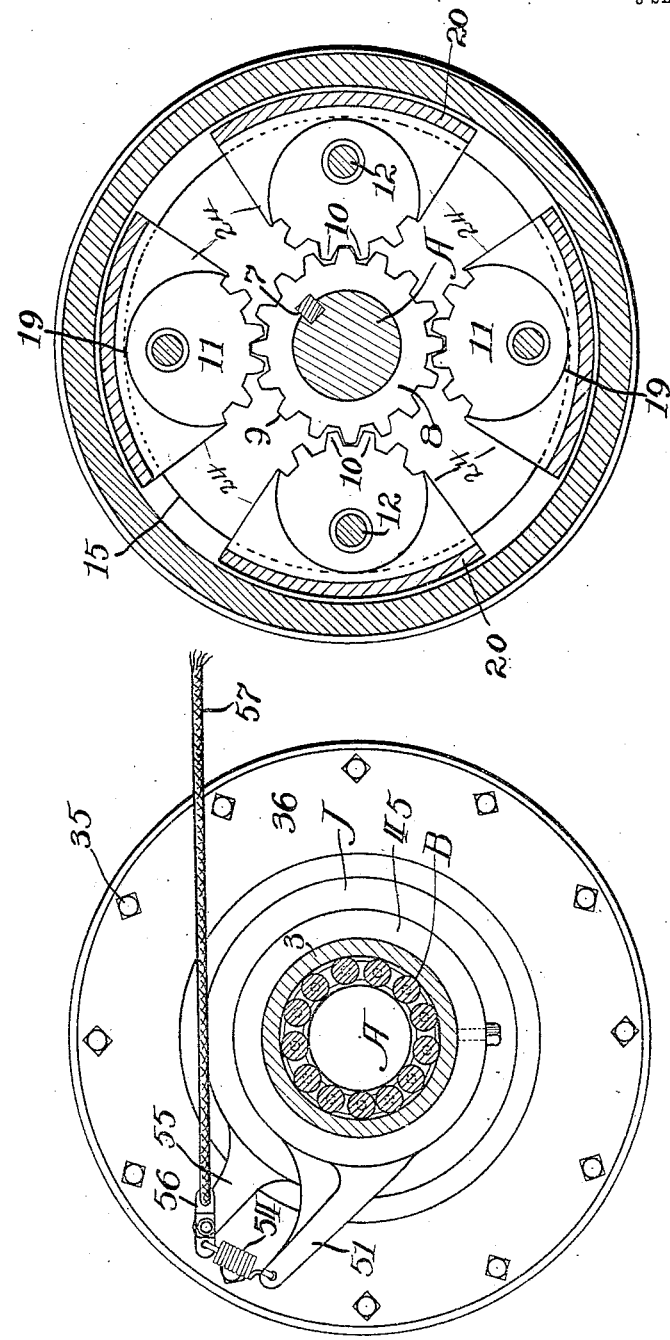
Witnesses:
L. H. Bradbury
H. Fischer
Inventor:
Wallace E. Belt,
by: J. G. Bradbury
Attorney.

No. 898,175. PATENTED SEPT. 8, 1908.
W. E. BELT.
POWER TRANSMISSION MECHANISM.
APPLICATION FILED JULY 8, 1907.
3 SHEETS—SHEET 3.
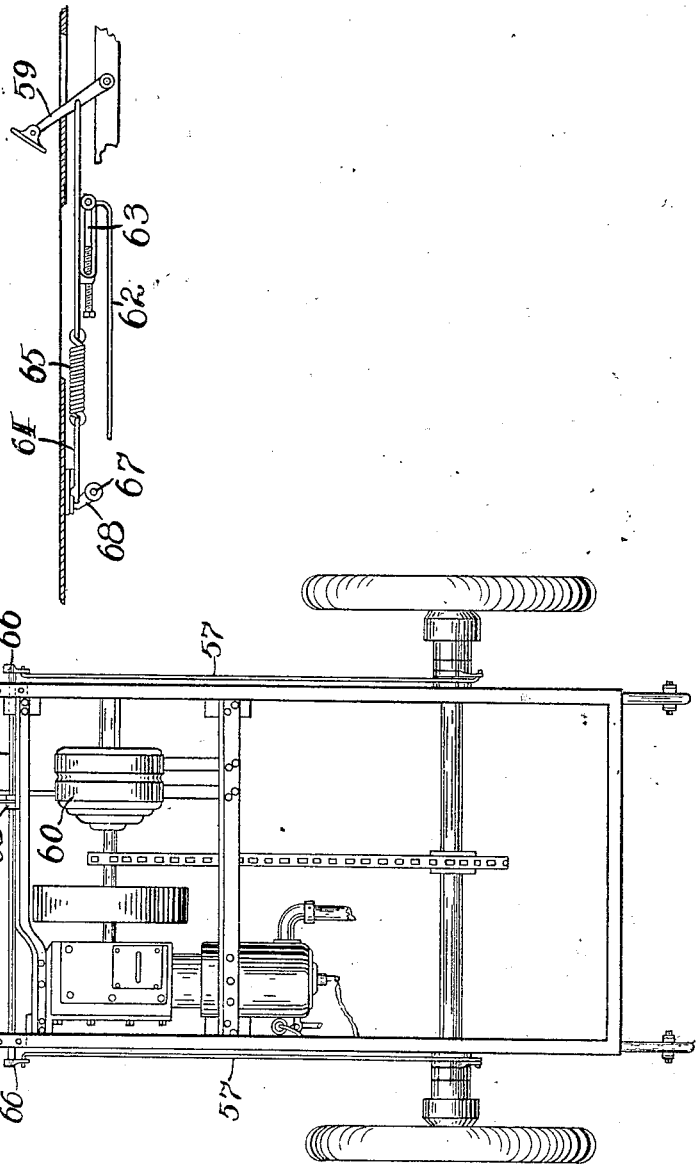
Witnesses:
A. R. Fischer
C. A. Fischer
Inventor:
Wallace E. Belt,
by: J. G. Bradbury
Attorney.

UNITED STATES PATENT OFFICE.

WALLACE E. BELT, OF DODGE CENTER, MINNESOTA.

POWER-TRANSMISSION MECHANISM.

No. 898,175.  Specification of Letters Patent.  Patented Sept. 8, 1908.

Application filed July 8, 1907. Serial No. 382,752.

*To all whom it may concern:*

Be it known that I, WALLACE E. BELT, a citizen of the United States, residing at Dodge Center, in the county of Dodge and State of Minnesota, have invented a new and useful Improvement in Power-Transmission Mechanism, of which the following is a specification.

My invention relates to that class of power transmission mechanism which is adapted for use on automobiles and other vehicles.

The primary object of my invention is to provide simple and effective mechanism for differentiating motion between driving and driven elements which is positive in action and equally effective when the direction of the motion between said elements is reversed.

Among further objects are simplicity of construction, effectiveness in use and a device of its kind which is not liable to get out of order when subjected to severe strains.

In the accompanying drawings, forming part of this specification, my invention is illustrated as applied to a motor vehicle in which by its use a single part axle or shaft may be employed. It is obvious that this invention may be applied to other uses than to self-propelled vehicles and two-part axles, and I do not wish to be understood as confining myself to this use alone by the following description.

In the drawings Figure 1 is a longitudinal central section of my invention; Fig. 2 is a transverse section taken on the line X—X of Fig. 1; Fig. 3 is a transverse section of Fig. 1 taken on the line Y—Y; Fig. 4 is a sectional view similar to that illustrated in Fig. 2 showing a construction of my invention without the use of springs between the gripping elements; Fig. 5 is a detail diagrammatic plan view showing my invention applied to the running gear of an automobile, and Fig. 6 is a detail side view of a portion of the running gear illustrated in Fig. 5.

A represents the axle or drive shaft of a self-propelled vehicle to which the power is supplied from the motor to the wheels, said shaft being mounted on roller bearings such as illustrated by the parts B running in a casing 3. At the ends of said casing are thrust antifriction ball bearings C and D. Upon the power shaft is loosely journaled at each end a wheel E and carried by the hub F of said wheel is my improved power-transmitting mechanism which is clearly illustrated in detail by the drawings. To the inner end of the hub or other part to be driven is fastened by means of bolts 4 a drum 5 which is provided with an inner cylindrical friction surface 6 on its flange and which is concentric with the drive shaft. On the shaft is fastened by the use of a key 7 (see Fig. 2) or other means a pinion 8 having teeth 9 in mesh with corresponding teeth 10 formed on the inner ends of levers 11. Each of the levers (four in number being shown, although any suitable number may be provided) is mounted to swing on a pivot 12 which is carried by a cage. This cage consists of a pair of parallel rings 14 and 15 which are spaced apart and held in position by thrust bearings D and G to avoid impingement against pinion 8, and loosely mounted on the shaft. Between these rings are the pinion 8 and levers 11, the latter being carried by means of pivots 12 in the form of bolts passing through said rings, one end of each bolt being threaded and riveted or otherwise fastened at 16 over the ring 14 and the other end passing through the ring 15 and provided with a nut 17 and split key 18 by which it is secured in place.

Each of the levers 11 is provided with an eccentric surface 19 working in a gripping element in the form of a shoe 20. The shoe referred to is evenly balanced on the lever to which it is connected so that when said lever is tilted in either direction it is adapted to move said shoe with its frictional surface 21 into frictional engagement with the inner surface 6 of the drum. The rings of the cage serve to hold the shoes from longitudinal displacement on the levers and the friction surface of each shoe is of comparatively large area thus producing a quick and effective contact with the drum when in use. When the shaft is at a standstill the levers are in inactive position as illustrated in Fig. 2; that is, the eccentric surfaces 19 are in neutral position and the shoes which they carry are out of frictional contact with the rim of the drum. When the shaft is turned in either direction, then a simultaneous swinging motion is given to the levers 11 so that the friction surfaces of the shoes on the several levers are moved into frictional contact with the inner surface of the drum to carry the latter along and thus drive the wheel from the shaft and in the same direction as the latter. When the motion of the axle or shaft is reversed then a reverse swinging motion is given to the levers to cause the friction surfaces of the shoes to move into frictional engagement with the inner surface of the rim of the drum. From the foregoing it will be seen that the power of the shaft A is almost instantly transmitted to the wheel to be driven and in the same direction that the shaft is rotated. A broad surface contact between the shoes and the drum is produced which causes the parts to firmly engage each other. When the shoes and levers are in neutral position, the springs 22 hold the shoes out of engagement with the drum. These springs are in the form of tension helixes which are connected by eyes 23 or other means, between the ends of the shoes as illustrated in Fig. 2. These springs however are not necessary for the successful operation of my invention, Fig. 4 illustrating a construction without them. When springs are not used, each shoe is journaled upon the eccentric surface of a lever 11 and provided with extensions 24 which hold the shoe on the lever so as to withdraw it out of contact with the drum when said parts are moved into neutral position.

When the power transmission as described is employed on automobiles and as long as the vehicle moves in a straight line either forward or backward both drive wheels turn together, but in case the vehicle travels around a curve, then the outer wheel releases from the shoes so that the vehicle readily and easily moves forward. As soon as the vehicle again shifts to a straight course the released shoes are moved immediately back into a locking or active position. There are conditions under which the levers are inactive to-wit: when for any reason both rear carriage wheels are revolving faster than the shaft, such as when going down hill with reduced power and on the level when suddenly withdrawing the power.

The hub F of the wheel to be driven is provided with a roller bearing 25 and between said bearing and the cage is a thrust bearing G and a drip plate 26, the latter abutting against a shoulder 27 on the drive shaft.

The casing 3 is held against longitudinal movement upon the shaft A between the thrust ball bearings C and D, the former being held in place by a collar 28 which is secured on the shaft by means of the set bolt 29. A packing 30 inserted between this collar and bearing C prevents dust from entering said bearing. The perimeter of the drum 5 may be provided with a band brake 31 of ordinary construction for the purpose of applying braking power to the wheels.

In connection with the clutch mechanism above described is provided retarding mechanism H which consists of the following parts: Secured upon the outer end of the drum by means of bolts 35 is a suitable face plate 36 having a centrally-disposed opening 37 into which the casing 3 is admitted freely. A friction ring 38 is carried upon pins 39 sliding longitudinally in the face plate and connected with the inner wear plate 40 of the antifriction ball bearing I. A coil spring 41 draws the friction ring back against the shoulder 42 upon the face plate 36 and out of contact with the ring 15 of the cage. This friction ring is pressed into contact with the plate 15 of the cage by means of a split collar J, the inner section 43 of which impinges against the bearing I and the outer section 44 against the collar 45 which is fastened upon the sleeve 3 by means of a set bolt 52. The intervening faces of said split collar are beveled at 47 so that when the outer section is turned it presses upon the bearing I and pushes the friction ring against the plate 15 of the cage. This does not change the relations of the drum, cage, shoes, and levers, nor does it have a direct retarding effect until the power is withdrawn to an extent that will cause the momentum to drive the wheels and drum attached thereto at a greater speed than the drive shaft A, in which event the cage is carried with the drum; the levers reversed; the shoes momentarily disengaged and immediately reëngaged; the parts then being in a position to lock the drum to the drive shaft and drive said shaft by the power of momentum (thus producing a retarding effect). The inner section of the split collar is provided with longitudinal slots 48 in which splines 49 on the outer surface of the casing 3 project, allowing said inner section to slide longitudinally and prevent it from turning. A band 50 carried by the outer section prevents dust from entering the joint between the sections of the split collar. The outer section 44 of the split collar J turns upon the casing 3 against a stop ring 45. The stop ring has an arm 51 and the outer section 44 of the split collar, an arm 55. To the arm 55 is pivotally secured a link 56 and between one end of said link and the end of the arm 51 is a draw spring 54 which returns the outer section of the split collar to normal position. The other end of said link has an operating cable 57 attached to it, said cable being connected with the foot transmission brake lever 59.

The primary object of the retarding mechanism described is to prevent coasting when braking the vehicle (by means of the transmission brake). In Fig. 5, 60 represents the ordinary transmission brake mounted upon the frame 61 of an automobile and provided with an ordinary operating rod 62, the end of which works freely in a slot 63. The transmission mechanism is also provided with a reach rod 64 containing an equalizing draw spring 65 and connected with the foot lever 59. The other end of the rod 64 is connected with a crank 68 which is carried by the shaft 67 journaled in said frame. The ends of the shaft 67 carry cranks 66 which are connected with each link 56 of my improved transmission mechanism by the cables 57.

When the lever 59 is pressed forward to apply the transmission brake it first operates the retarding mechanism as soon as power is reduced and causes the clutch levers to move the shoes into engagement with the drum (in reversed position), thus communicating motion from the wheels through the axle to the ordinary transmission mechanism. The continued forward movement of the foot lever applies the transmission brake in the ordinary manner. The equalizing draw springs 54 and 65 return the foot lever and retarding mechanism to normal position when said lever is released.

In accordance with the patent statutes, I have described the principle of operation of my invention, together with the apparatus which I now consider to represent the best embodiment thereof, but I desire to have it understood that the apparatus shown is only illustrative and that the invention can be carried out by other means and applied to uses other than those above set forth, within the scope of the following claims.

Having described my invention, what I claim as new and desire to protect by Letters Patent, is:—

1. In combination with the hub of a wheel to be driven, provided with a friction surface, a drive shaft, a system of levers, each provided with an eccentric surface, a friction shoe carried upon said eccentric surface, and means carried by said shaft for turning said levers and causing said shoes to impinge against said friction surface and transmit motion from said shaft and for holding said levers inoperative when the driven element rotates at a greater speed than the driving element.

2. A power transmission mechanism comprising in combination with the hub of a wheel to be driven, a friction drum on said hub, a drive shaft, a suitable cage, a pinion on said shaft, a plurality of levers fulcrumed on said cage and in mesh with said pinion, each of said levers provided with an eccentric surface, a shoe on each of said eccentric surfaces, said eccentric surfaces adapted to impinge said shoes against the friction surface of said drum when said shaft revolves in either direction, and means for retarding the movement of said cage.

3. A power transmission mechanism comprising in combination with the hub of a wheel to be driven, a friction drum on said hub, a drive shaft on which said hub is freely journaled, a suitable cage, a pinion on said shaft, a plurality of eccentrics journaled upon said cage and in mesh with said pinion, a shoe carried upon each eccentric, means for automatically holding said shoes inoperative when the driven element rotates faster than the driving element, a thrust bearing between said cage and hub, and means for retarding the movement of said cage.

4. A power transmission mechanism comprising a drive shaft, a pinion secured on said shaft, a suitable cage, a plurality of levers fulcrumed on said cage and in mesh with said pinion, and provided with eccentric surfaces, a friction shoe carried by the eccentric surfaces of said levers, a drum connected with the part to be driven and adapted to be engaged in the inner surface of its rim by said shoes, a thrust bearing for said cage, and means for retarding the movement of said cage.

5. A power transmission mechanism comprising a drive shaft, a pinion secured on said shaft, a cage, a plurality of levers fulcrumed on said cage and in mesh with said pinion, and provided with double eccentric surfaces, a friction element carried by each of said eccentric surfaces, a drum connected with the part to be driven adapted to be engaged in the inner surface of its rim by the said frictional elements, and a thrust bearing for said cage.

6. A power transmission mechanism comprising a drive shaft, a pinion secured on said shaft, a cage, a plurality of levers fulcrumed on said cage and in mesh with said pinion, a drum connected with the part to be driven, a frictional element between each of said levers and said drum, and means for tending to prevent said cage from rotating with the shaft, for the purposes specified.

7. A power transmission mechanism comprising a pinion on the driving part, a drum connected with the part to be driven, a plurality of levers in mesh with said pinion and provided each with a double eccentric surface, and a shoe carried upon each eccentric surface for engagement with said drum in either direction.

8. A power transmission mechanism comprising a drive shaft, a pinion secured on said shaft, a cage, a plurality of levers fulcrumed on said cage in mesh with said pinion, each being provided with an eccentric surface, a friction shoe carried upon each of said eccentric surfaces, and a drum connected with the part to be driven and adapted to be frictionally engaged at the inner surface of its rim by said shoes in either direction.

9. A power transmission mechanism comprising a drive shaft, a member secured thereon, a cage around said shaft, a plurality of levers fulcrumed on said cage, each being provided with an eccentric surface, and connected with said member for the latter to impart a swinging motion to said levers, a drum on the part to be driven and a shoe on each eccentric surface adapted to engage the inner surface of the rim of said drum in either direction.

10. A power transmission mechanism comprising a drive shaft, a member secured thereon, a cage around said shaft, a plurality of levers fulcrumed on said cage and connected with said member for the latter to impart a swinging motion thereto, each of said levers having an eccentric surface, a drum on the part to be driven, and a shoe on each of said eccentric surfaces and adapted to be engaged at the inner surface of the rim of said drum in either direction of rotation.

11. In combination with the hub of a wheel to be driven, a friction drum carried by said hub, a drive shaft on which said hub is freely journaled, a casing containing said shaft, a cage within said drum, a pinion on said shaft, a plurality of levers fulcrumed on said cage and in mesh with said pinion, each lever being provided with an eccentric surface, a shoe on each eccentric surface and adapted to be thrust by said levers into contact with said drum, means for withdrawing said shoes out of contact with said drum when said levers are moved into neutral position, thrust bearings between said hub, casing and cage, and means for tending to retard the revolving movement of said cage, for the purposes specified.

12. A power transmission mechanism comprising in combination with the part to be driven provided with a friction surface, a driving part, a system of levers carried by said driving part and provided with means for causing them to turn, friction shoes carried upon said levers and adapted thereby to be thrust into contact with said friction surface and withdrawn into neutral position, retarding means for holding said levers inoperative when the driven element rotates at a greater speed than the driving element, and mechanism for setting said retarding means, for the purposes specified.

13. A power transmission mechanism comprising in combination with the part to be driven, a driving part, clutching means provided with friction shoes to engage the part to be driven in either direction, means rotating with said driving part and connected with said clutching means for controlling the latter, retarding mechanism in connection with said driving part, and means for setting said retarding mechanism, for the purposes specified.

14. In combination with the hub of a wheel to be driven, a friction drum carried by said hub, a drive shaft on which said hub is freely journaled, a casing containing said shaft, a cage within said drum, a pinion on said shaft, a plurality of levers fulcrumed on said cage, in mesh with said pinion and provided with eccentric surfaces, shoes carried upon said eccentric surfaces and adapted to be moved into frictional contact with said drum, thrust bearings between the hub and casing and said cage, retarding mechanism co-acting with said cage, and means for throwing said retarding mechanism into and out of connection with said cage, for the purposes specified.

In testimony whereof, I have signed my name to this specification, in the presence of two subscribing witnesses.

WALLACE E. BELT.

Witnesses:
J. W. DAHLGREN,
H. L. FISCHER.